April 12, 1949.   W. A. WEIGHTMAN   2,466,668
ASSEMBLY DEVICE, ESPECIALLY WELDER
Filed May 10, 1947   11 Sheets-Sheet 1
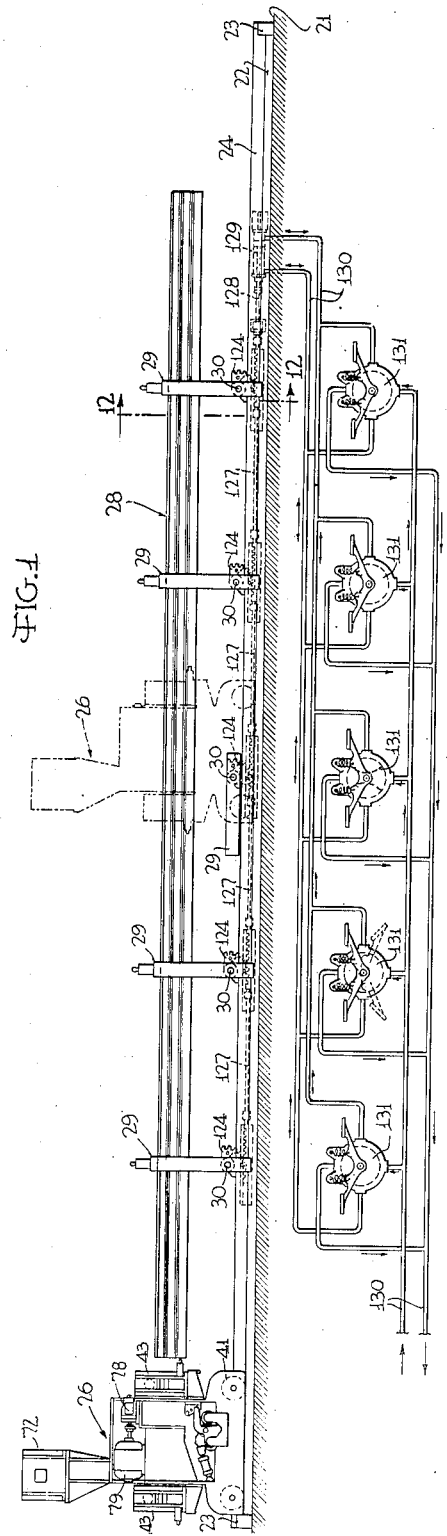
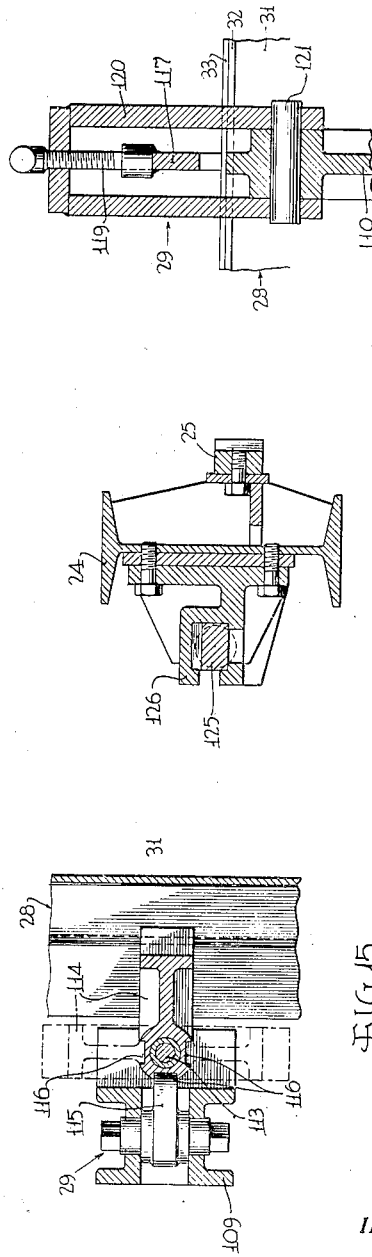
INVENTOR
William A. Weightman
BY Maurice A. Crews
ATTORNEY

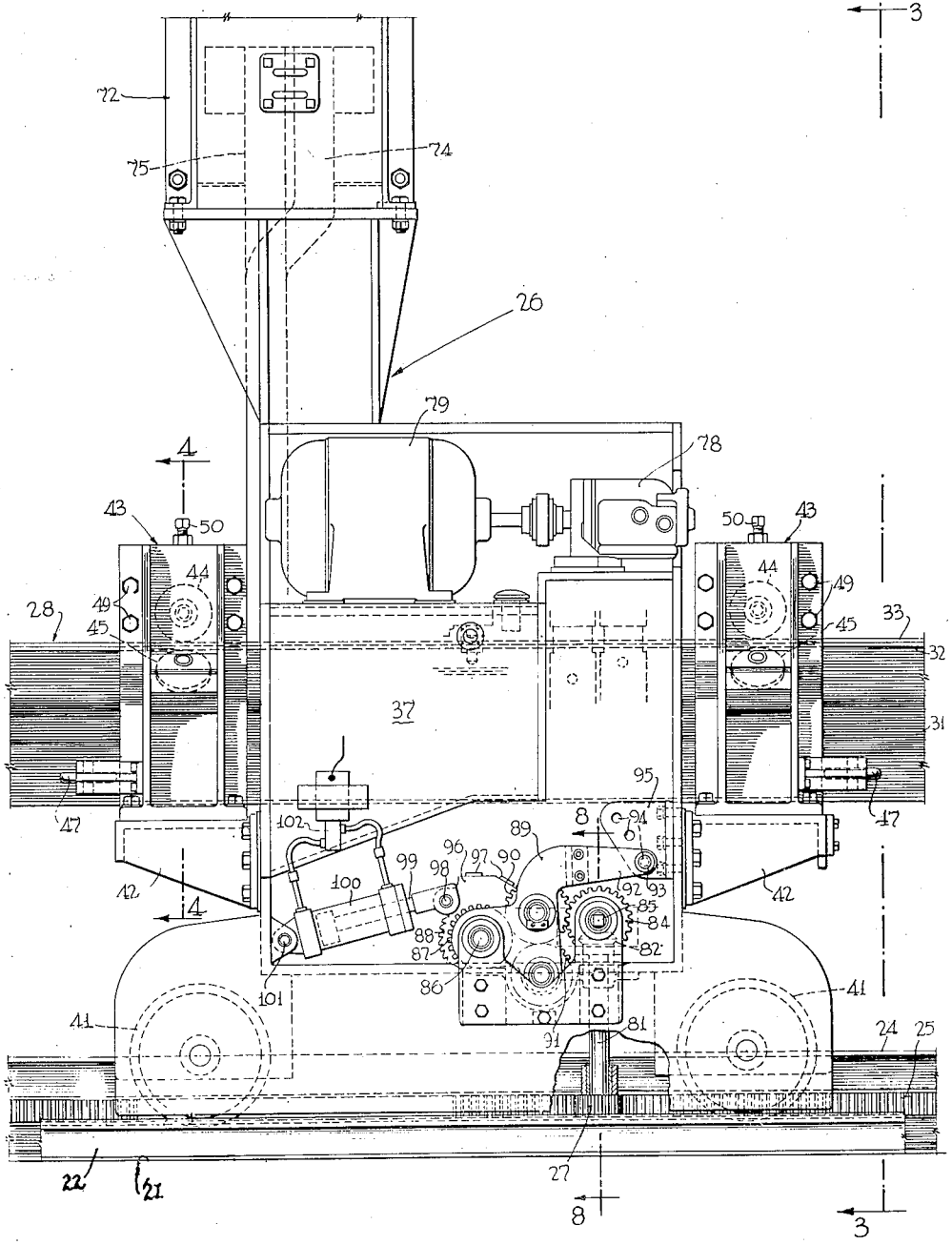

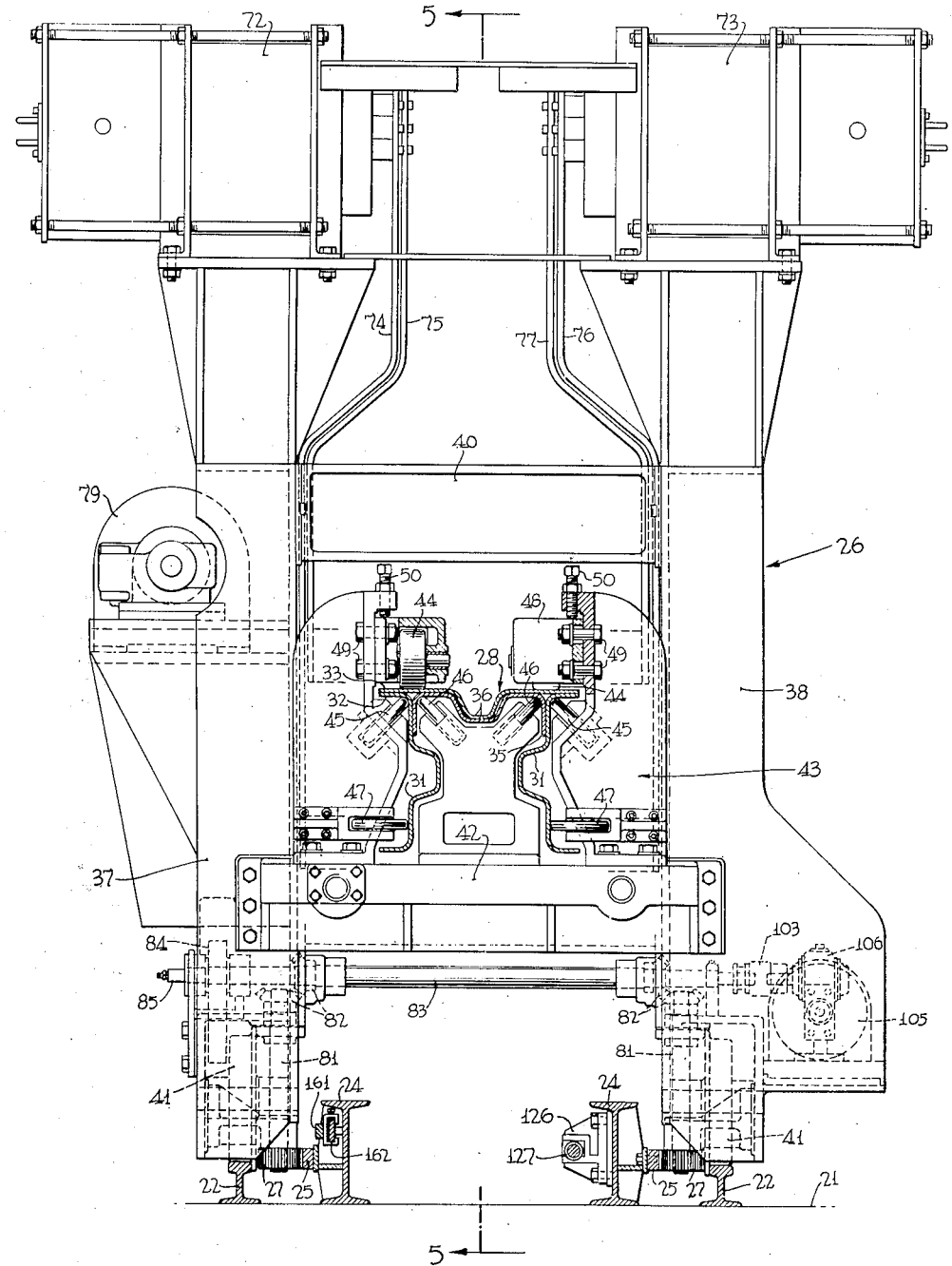

April 12, 1949. W. A. WEIGHTMAN 2,466,668
ASSEMBLY DEVICE, ESPECIALLY WELDER
Filed May 10, 1947 11 Sheets-Sheet 4

INVENTOR
William A. Weightman
BY Maurice A. Crews
ATTORNEY

April 12, 1949.   W. A. WEIGHTMAN   2,466,668
ASSEMBLY DEVICE, ESPECIALLY WELDER
Filed May 10, 1947   11 Sheets-Sheet 5

INVENTOR
William A. Weightman
BY Maurice A. Crews
ATTORNEY

April 12, 1949.  W. A. WEIGHTMAN  2,466,668
ASSEMBLY DEVICE, ESPECIALLY WELDER
Filed May 10, 1947  11 Sheets-Sheet 6

INVENTOR
William A. Weightman
BY Maurice A. Crews
ATTORNEY

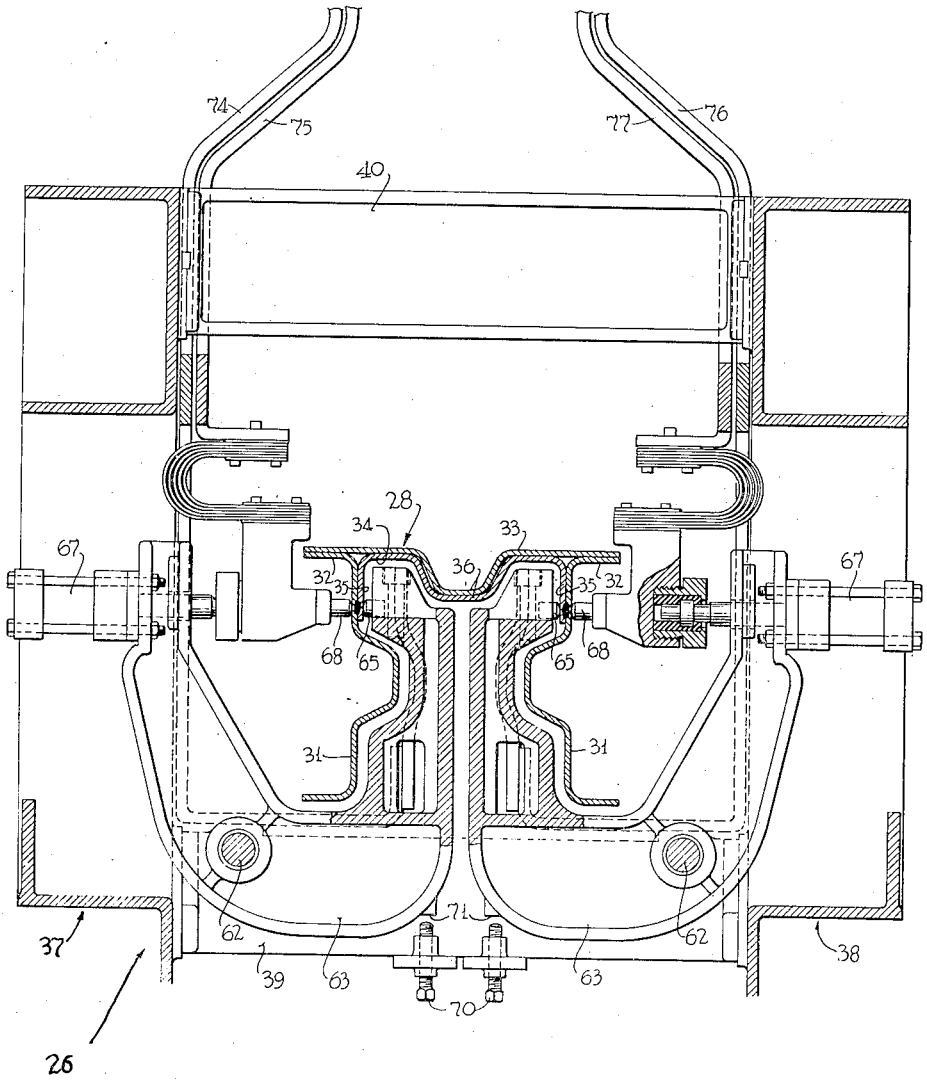

April 12, 1949.   W. A. WEIGHTMAN   2,466,668
ASSEMBLY DEVICE, ESPECIALLY WELDER
Filed May 10, 1947   11 Sheets-Sheet 8

INVENTOR
William A. Weightman
BY Maurice A. Crews
ATTORNEY

April 12, 1949. W. A. WEIGHTMAN 2,466,668
ASSEMBLY DEVICE, ESPECIALLY WELDER
Filed May 10, 1947 11 Sheets-Sheet 9
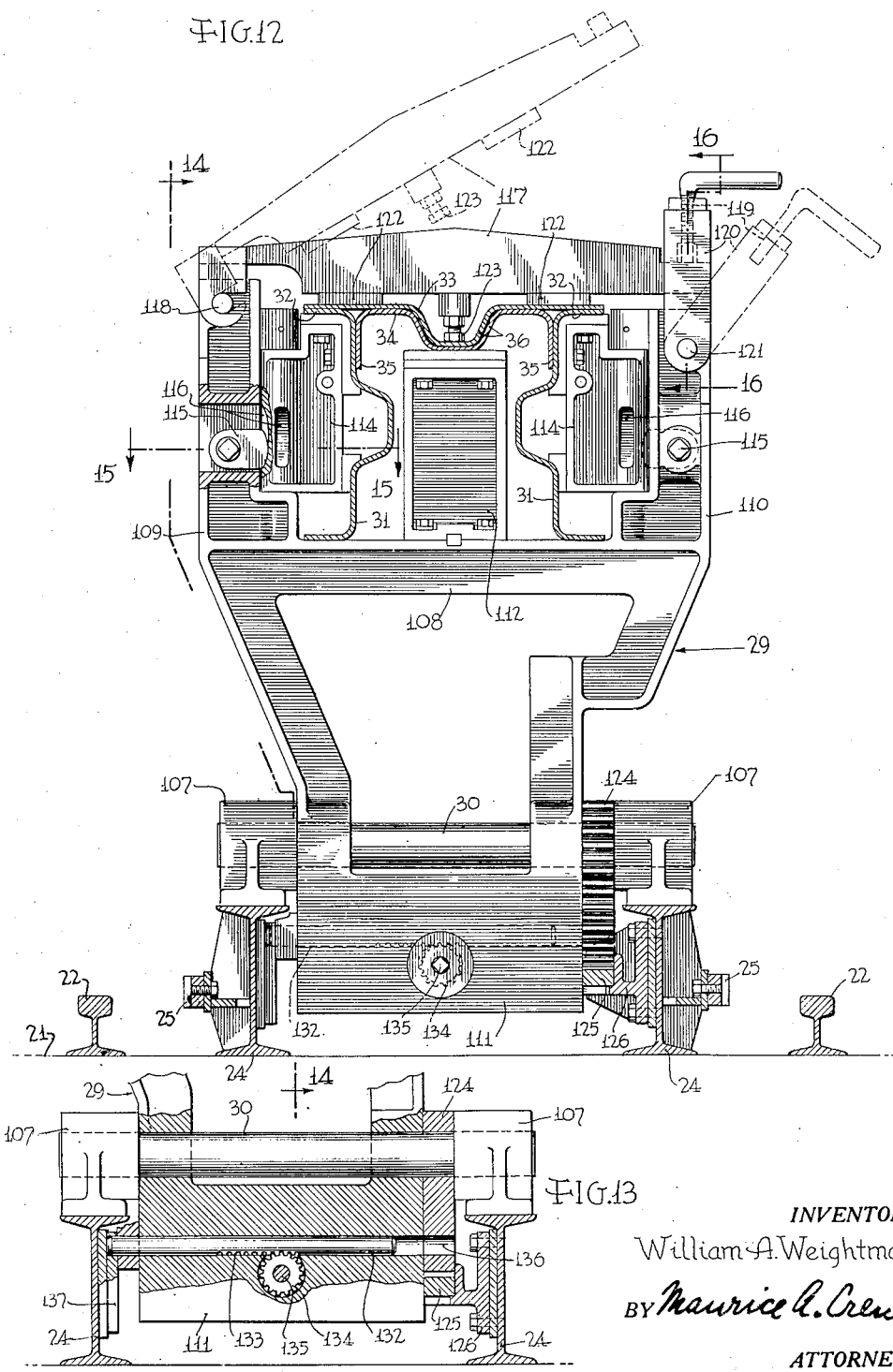
INVENTOR
William A. Weightman
BY Maurice A. Crews
ATTORNEY

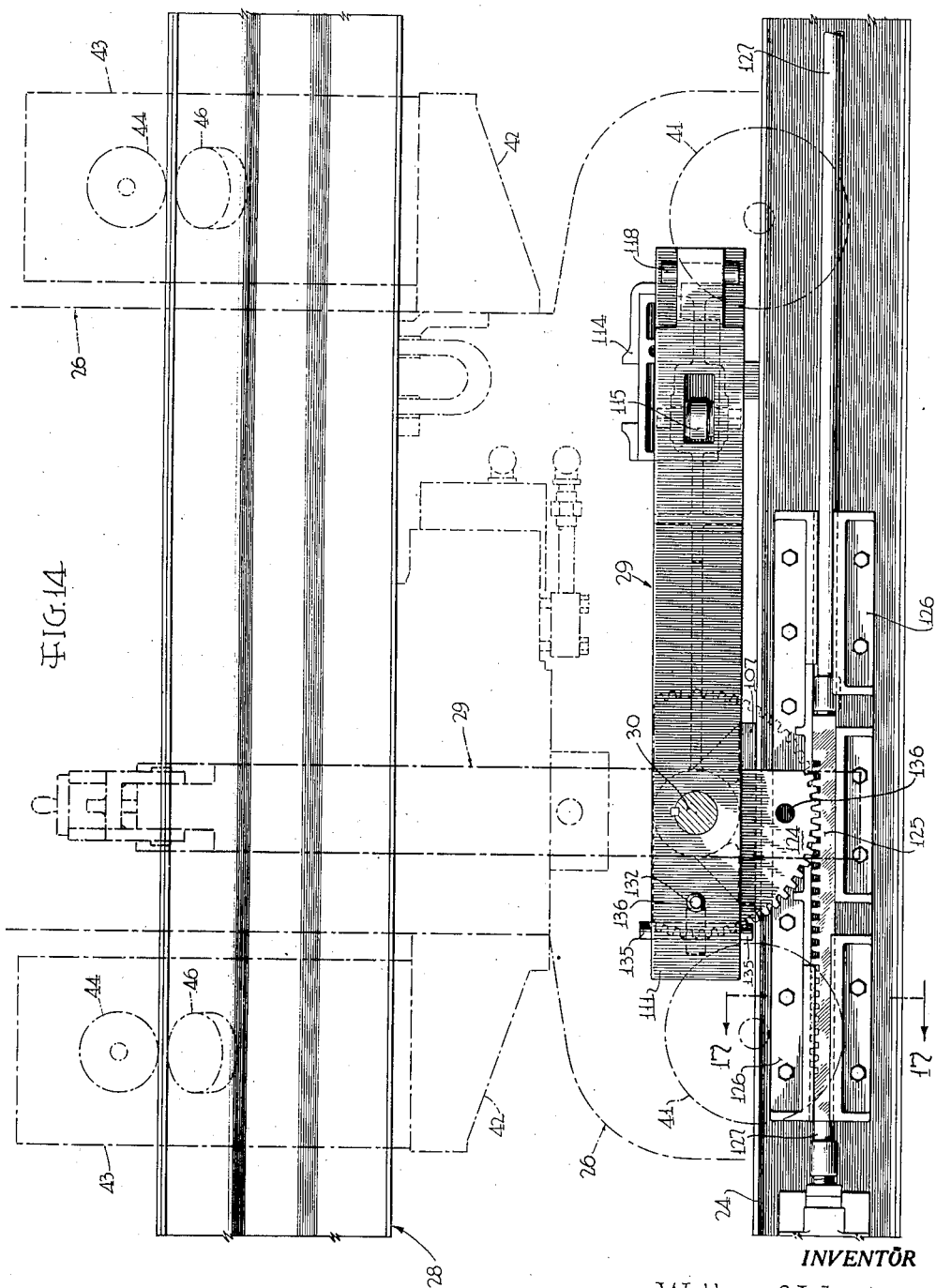

Patented Apr. 12, 1949

2,466,668

UNITED STATES PATENT OFFICE 2,466,668

ASSEMBLY DEVICE, ESPECIALLY WELDER

William A. Weighman, Philadelphia, Pa., assignor to The Budd Company, Philadelphia, Pa., a corporation of Pennsylvania Application May 10, 1947, Serial No. 747,173

21 Claims. (Cl. 219—4)

1

The invention refers to a machine for assembling and securing metal parts and especially to a machine in which the connecting of the assembled component parts of a beam structure is done by an electric spot welder. More particularly, the invention relates to a machine for spot welding together elongated sheet metal profiles into a heavy beam as used for the center sill of a railway car.

An object of the invention is to provide a machine of the indicated type which holds the parts entering into the construction in accurate relative location during the assembling operation.

Another object is to provide a machine permitting the assembly of all profiles entering into a beam structure in a single continuous operation.

A still further object is to provide a machine which, after the initial set-up has been made, performs the connecting operations over the length of the beam or the like automatically so as to require merely supervision and the performance of a few manual operations by workmen.

Another object is to provide a machine which connects the component parts by a great number of welds of uniform and predetermined quality so as to give the welded structure the strength and other physical qualities required, a feature which is obviously of great importance in such highly stressed structures as a center sill of a railway car.

A further object is to provide a machine of the indicated type which is of relatively simple construction, which is durable and rugged and which is easy to operate.

Among the objects is also to provide a machine of the indicated type adapted to be used for a variety of different forms and sizes of members to be assembled.

A more specific object is to provide a machine for welding together flanged sheet metal profiles into a channel section center sill of a railway car in which the profiles are connected by outwardly projecting flanges as well as by parts which overlap each other in the interior of the sill.

The foregoing objects and further objects and advantages of the invention are achieved according to the invention by providing a welding machine having a welding unit movable relative to the profiles forming the component parts of a beam, which machine is provided with means for holding the component profiles accurately positioned relatively to each other, these profile-holding means being also movable relatively to such profiles.

Another feature of the invention resides in the

2 combination of assembling means for holding the profiles in the required positions relatively to each other and to the welding unit at points remote from the location of the welding unit.

A still further feature of the invention resides in the arrangement and formation of the welding electrodes so as to permit their entry into the interior of the hollow sill as well as their automatic operation without interference with each other.

Further objects, advantages and features of the invention will be understood from consideration of the following detailed description and attached drawing, in which Figure 1 is a small-scale diagrammatic side elevation of the entire machine with a beam to be assembled shown in place;

Figure 2 is a side elevation of the welding unit of the machine together with a part of the beam to be assembled and part of the supporting structure for the machine;

Figure 3 is an end elevation of the unit shown in Figure 2 viewed in the direction of the arrows on line 3—3 of Figure 2, certain parts of the machine, the sill held in it and the supporting rails being shown in section;

Figure 7 is a fragmentary vertical transverse section along line 7—7 of Figure 5 on the scale of Figure 6 showing one pair of the horizontal electrodes;

Figure 12 is an elevation of one of the work supports together with the supporting structure in section along line 12—12 of Figure 1 but on a much larger scale;

Figure 13 is a fragmentary transverse sectional view of part of the structure illustrated in Figure 12 with certain portions broken away to illustrate the interior structure;

Figure 14 is a side elevation partly in section along line 14—14 of Figure 12, showing in full lines the work support folded down and in phantom lines the lower part of the welding unit and the work support in upright position;

Figures 15 and 16 are fragmentary sections along the correspondingly numbered lines of Figure 12;

Figure 17 is a fragmentary section along line 17—17 of Figure 14; and

Figure 10:
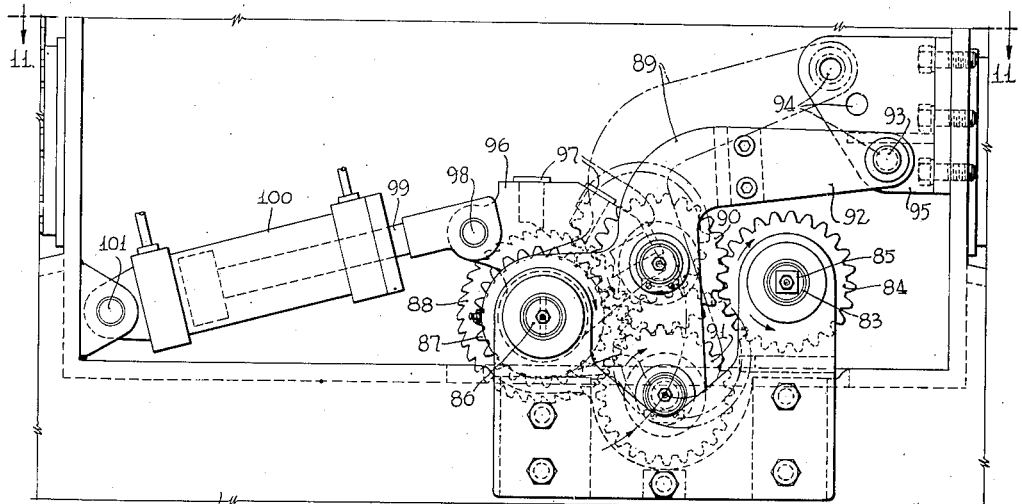
Figure 10 is a fragmentary side elevation of part of the machine shown in Figure 2 but on a larger scale showing the indexing mechanism for moving the welding unit step-by-step from one welding station to the next.
Figure 11:
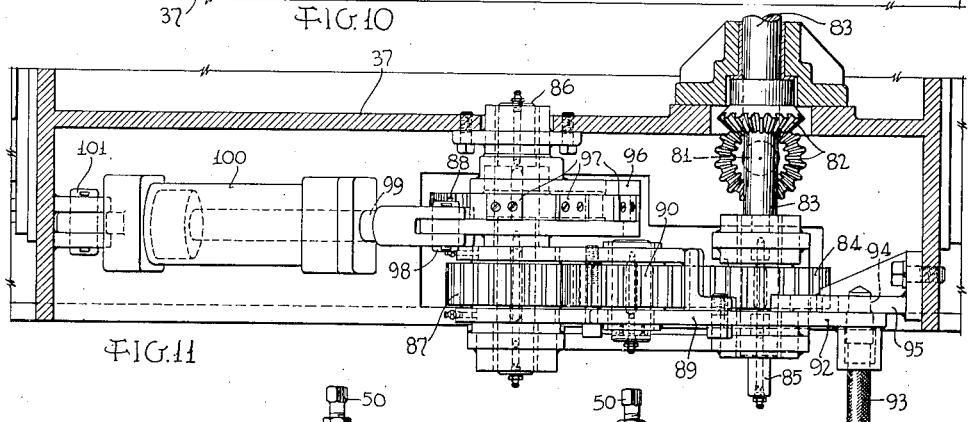
Figure 11 is a fragmentary plan view and section along line 11—11 of Figure 10.
Figure 4:
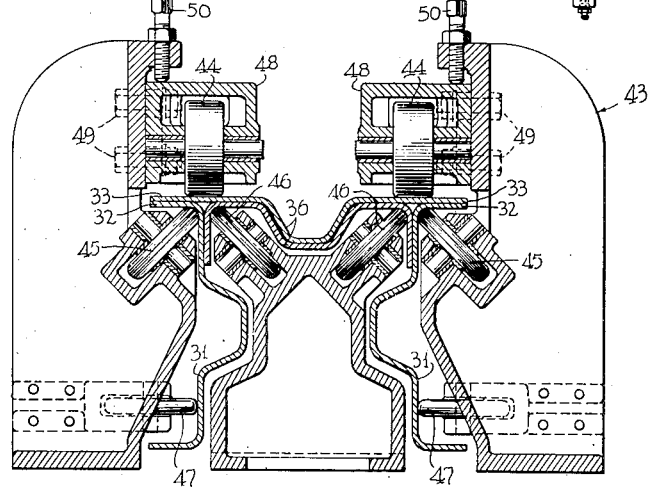
Figure 4 is a fragmentary section on a larger scale along line 4—4 of Figure 2.

Secured to the floor 21 are a pair of transversely spaced rails 22 provided with stops 23 at their ends. Between and parallel to the rails are arranged two I-sections 24 each carrying on its outside a rack 25. Carried by and movable on the rails 22 is a welding machine unit 26 carrying pinions 27 (Figure 3) meshing with the racks 25. Longitudinally spaced devices or jigs 29 are supported by the sections 24 swingably about individual transverse axes 30, and these jigs 29 in turn support the work 28, which has the form of a long beam.

The invention is illustrated as applied to the welding of a channel section beam 28 to be used for a center sill of a railway car. This beam is assembled in the machine in upside-down position; it has side walls 31 provided with bottom flanges 32 which overlap the marginal portion of an outer bottom member 33 while an inner bottom member 34 overlaps the outer bottom member and by marginal flanges 35 the inside of the side walls 31. The two bottom members 33 and 34 are each provided with an inwardly projecting longitudinal channel 36, and these channels are internested. The three members 31, 33 and 34 constituting the beam may be formed of sheet metal on a draw bench. The sheet metal may be cold rolled austenitic stainless steel or another high-strength material. The sections entering into the beam are held prior to and during the welding operation in a predetermined position by the supports 29 and by parts of the welding unit 26, as will be described in detail later on.

The welding unit has a rigid frame comprising longitudinally and vertically extending side members 37, 38 interconnected by a lower transverse member 39 and an upper transverse member 40. This frame is supported on the rails 22 by two pairs of wheels 41 which are freely rotatable in bearings of the side frames 37, 38.

Brackets 42 secured to the front and back of the supporting frame carry devices 43 including rollers 44, 45, 46 and 47 for insuring the exact relative positions of the beam members 31, 33 and 34. The cylindrical horizontal rollers 44 press on the outside of the bottom member 33 above the side walls 31 while the rollers 45 and 46 are arranged at about 45 degrees and press into the corners between side walls 31 and flanges 32 and between the inner bottom member 34 and its flanges 35. The other horizontally arranged rollers 47 press against the side walls 31 near their free margins.

The top rollers 44 are each supported in a member 48 held in place by slide and bolt connections 49 and are vertically adjustable by screws 50 so as to insure the correct relative adjustment of the different rollers and the desired pressure on the members of the workpiece.

Obviously, the devices 43 hold the workpieces in the exact desired position relative to each other and to the welder unit while permitting unrestricted movement of the welder unit and the workpieces in the longitudinal direction of the latter. Between the two devices 43 are arranged the devices for connecting the sections of the beam with each other, which devices are, in the shown embodiment, pairs of spot welding electrodes, which will now be described.

Arranged in a transverse row and supported by the upper transverse frame member 40 are five hydraulic cylinders, a central cylinder 51 and two pairs of outwardly adjacent cylinders 52 and 53. The piston rods of these cylinders carry welding electrodes 54, 55 and 56 respectively.

A similar series of hydraulic cylinders 51', 52' and 53' are supported by the lower transverse frame member 39 and have their piston rods connected with welding electrodes 54', 55' and 56' respectively aligned with the correspondingly numbered aforesaid upper electrodes.

The piston rod of cylinder 51' is surrounded by the member or bracket 57 forming a rigid part of the machine frame and serving for guiding on a straight vertical path members 58 inserted between the piston rods of the cylinders 52' and the appertaining electrodes 55'. The electrode 54' is, in turn, guided on the aforesaid members 58. Inserted between the outer electrodes 56' and their piston rods are members 60 guided for vertical up and down movement on brackets 61 of the side frame members 37, 38. The arrangement and form of the lower electrode supporting members is such as to clear the workpiece and to permit free passage thereof through the machine when not engaged by the electrodes during the welding operations.

Figure 6:
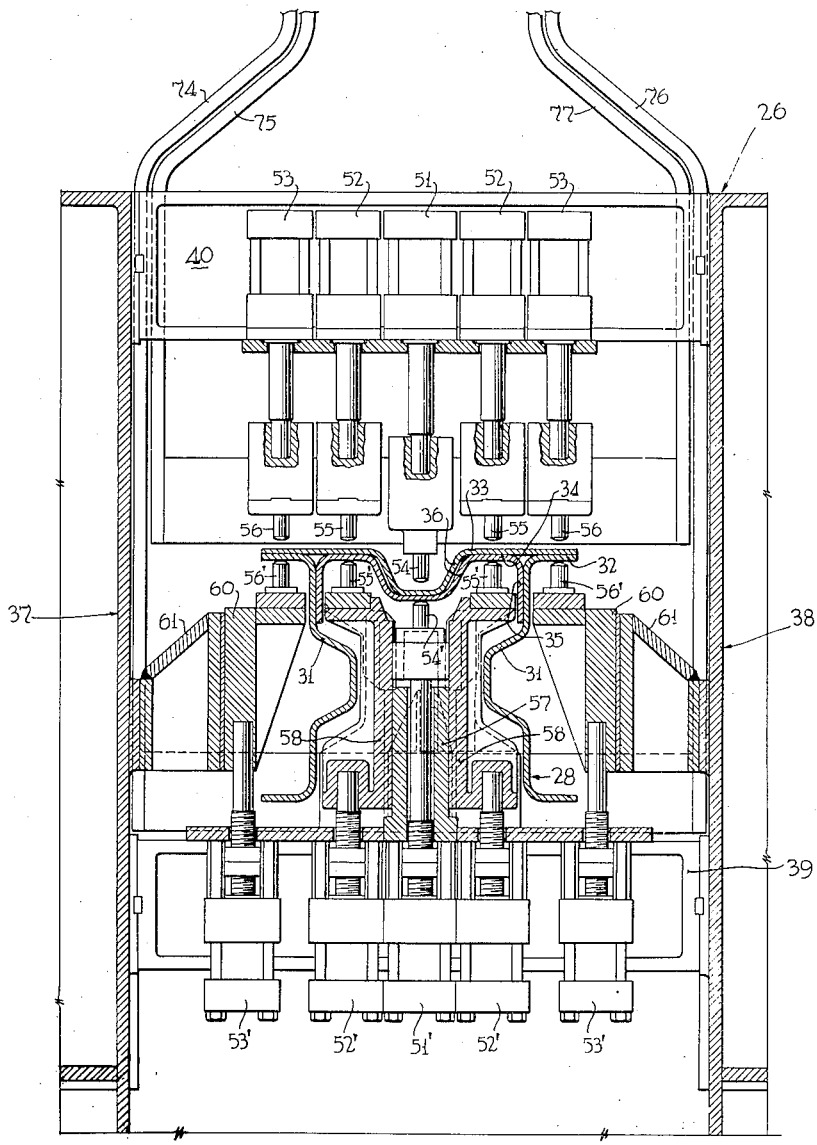
Figure 6 is a vertical transverse fragmentary section along line 6—6 of Figure 5 on a larger scale.

From Figure 6 it is apparent that the electrodes so far described are adapted for making five welds in a single position of the weld unit; one pair of welds between the flanges 32 of the side walls 31 and the margins of the outer bottom member 33, one pair of welds between the marginal horizontal portion of the inner bottom member 35 and the overlapping portions of the bottom member 33, and one weld between the overlapping bottom walls of the channel section portions 36. How these welds are sequentially made will be described later on.

Figure 5:
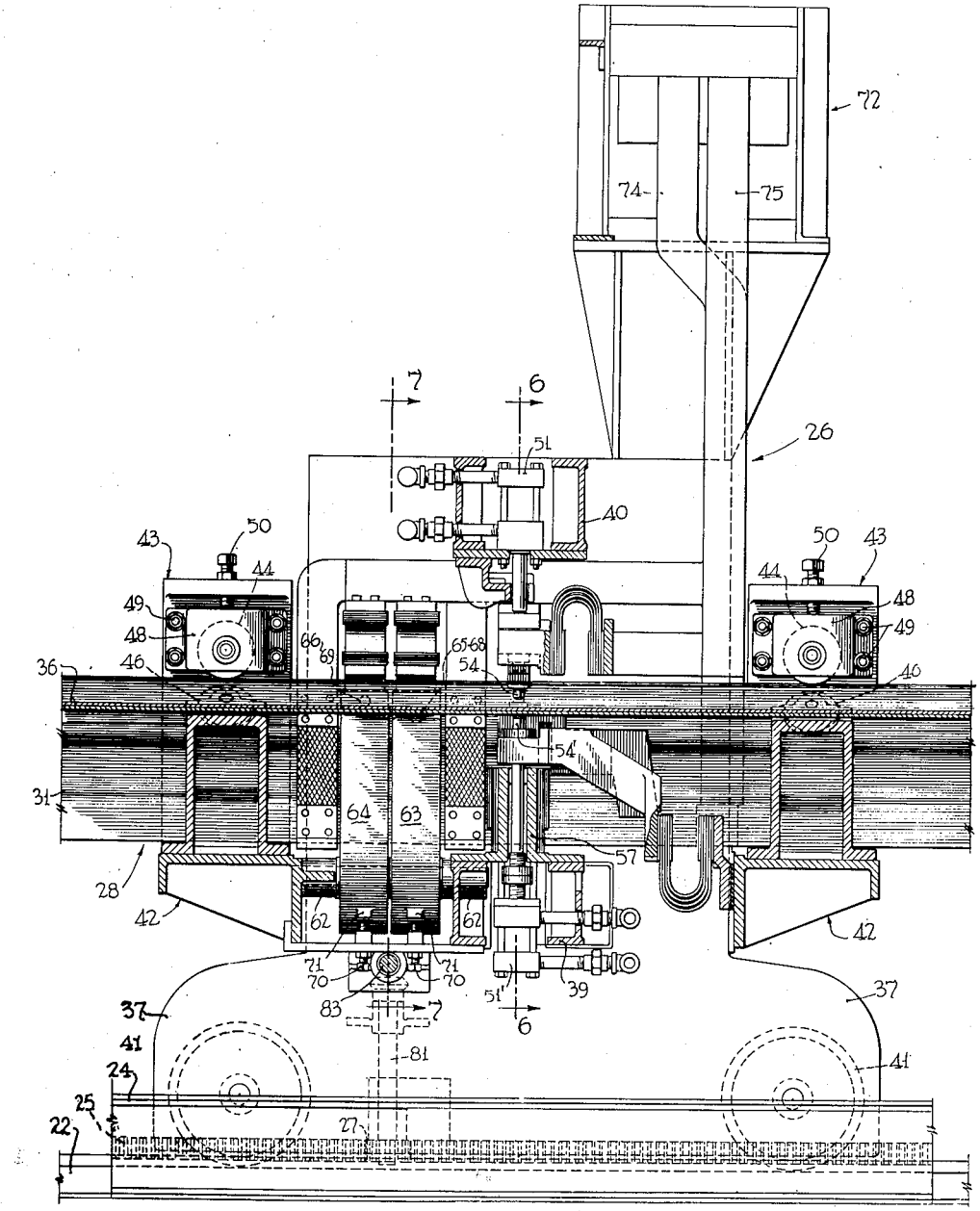
Figure 5 is a longitudinal vertical section through the welding unit along line 5—5 of Figure 3.

A horizontal shaft 62 is provided on each side of the welding unit near the respective side frames 37, 38. Each of these shafts 62 carries swingably a pair of U-formed yokes 63, 64 (see Figures 5, 7 and 18). The inner arm of each of these yokes carries electrodes 65, 66 respectively, while the outer arms are connected with a cylinder 67, 67', the pistons of which carry electrodes 68, 69 respectively. The electrodes 65, 68 and 66, 69 are aligned with each other. It should be noted that the electrodes 65, 68 are designed for engagement with the side walls 31 and the flange 35 of the inner bottom wall near the free margins of said flanges while the electrodes 66, 69 are designed for engagement with the same members near the horizontal portions of the bottom walls of the workpiece. In other words, the electrodes 65, 68 and 66, 69 are designed for effecting at a given position of the welding unit relative to the workpiece on each side of the latter two welds, which are offset relative to each other in vertical and longitudinal direction. It should also be observed that the axes of the horizontal electrodes are spaced in the longitudinal direction of the workpiece from the vertically arranged electrodes described hereinbefore.

The inner arms of the yokes 63, 64 are shaped to clear the workpieces so as to permit lengthwise free passage of the workpiece through the welding unit. On account of the swivel suspension on the shafts 62, the horizontal electrodes may engage the workpiece unrestrictedly from both sides if pressure is applied to the cylinders 67, 67', as will be described more fully later on. If the pressure is released and the electrodes 68, 69 are withdrawn, then the electrodes 65, 66 become disengaged from the workpiece on account of the arrangement of the shaft 62 on the outside of the center of gravity of the yokes 63, 64 causing the inner arms of the yokes to move down under the influence of their own weight, thereby moving the electrodes out of contact with the workpiece. For such clearance, but a slight swivel movement of the yokes 63 is necessary. Further swivel movement is prevented by the adjustable stops 70 engaging projections 71 of the yokes.

Figure 18:
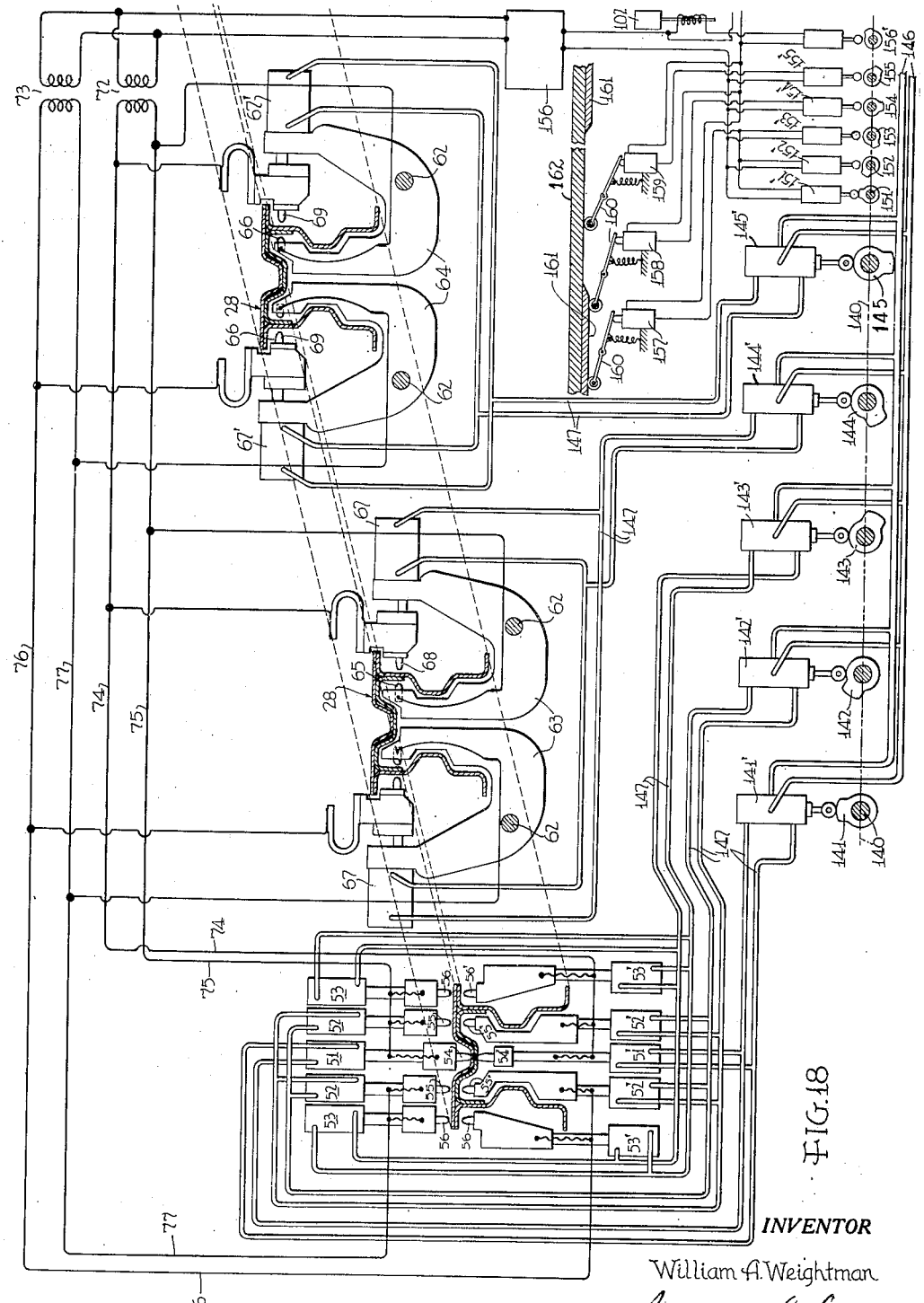
Figure 18 is a diagram of the electrodes and of the operating system for the electrodes.

All the electrodes on the one side of the machine and the central electrodes 54, 54' are connected by bus bars to the secondary of one welding transformer 72, all electrodes on the other side of the machine are connected by bus bars to the secondary of a second transformer 73. Some of these bus bars and their connections to the electrodes are shown in the drawing at 74, 75 and 76, 77. A diagrammatic outline of the electrical connections is shown in Figure 18 and will be explained later on in the description of the operation of the machine.

The pressure medium for operating the hydraulic cylinders is supplied by a pump 78 driven by an electric motor 79. This pump and its drive, as well as a storage tank for the pressure medium, will likewise not be described in detail, as they may be of conventional design.

The welding unit is provided with two devices for moving it along its track 21, one device for moving it by equal increments from one welding station to the next, and another device for moving it without interruption from one position to another remote position; e. g., for moving it from the end position back to the initial position for starting work on another beam. Both devices work on the pinions 27 meshing with the racks 25 as briefly mentioned in the beginning of this description.

Figure 9:
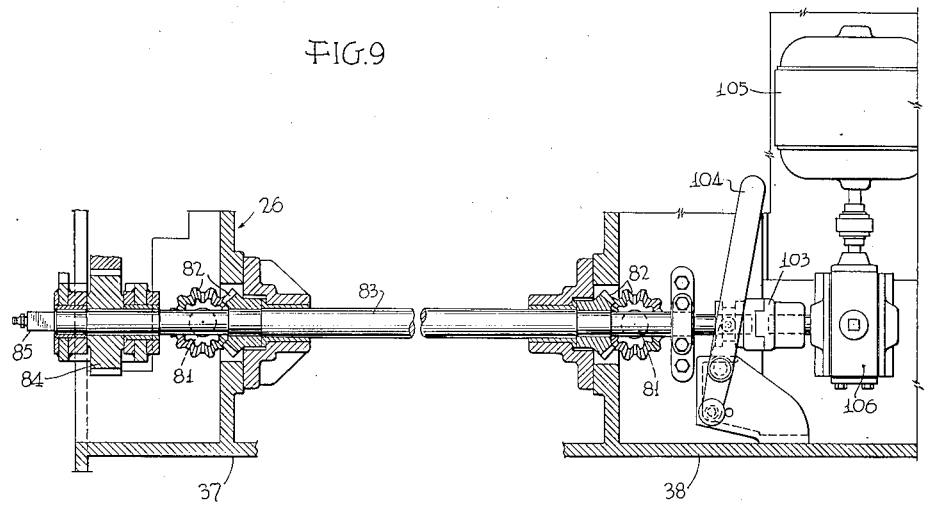
Figure 9 is a fragmentary horizontal section along line 9—9 of Figure 8.
Figure 8:
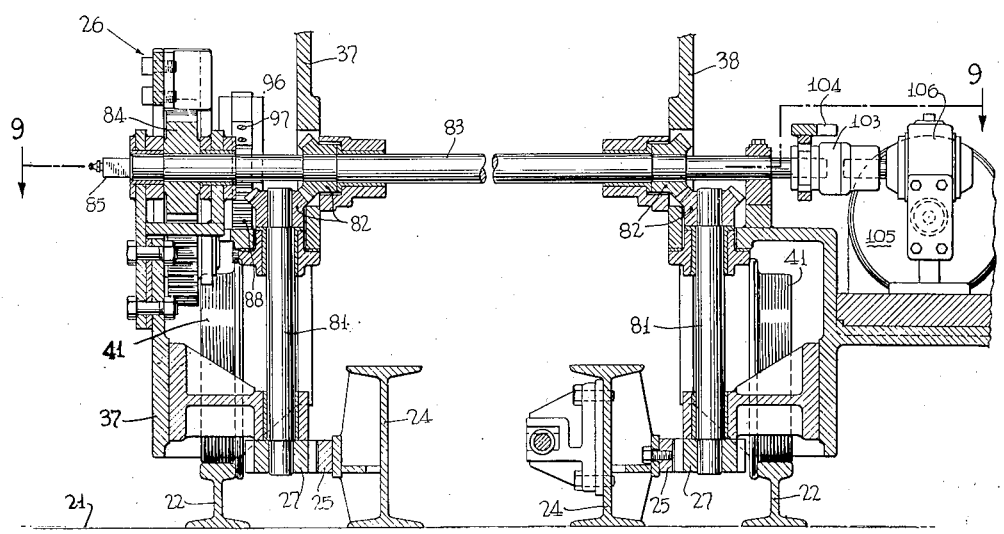
Figure 8 is a fragmentary vertical transverse section along line 8—8 of Figure 2 on a larger scale showing details of the gear and driving mechanism for moving the welding unit on its supporting rails.

The hereinbefore described pinions 27 are keyed to vertical frame-supported shafts 81 which are drivingly connected by bevel gears 82 to a horizontal transverse shaft 83. On the side of the frame member 37, the shaft 83 has keyed to it a pinion 84 and the free end of the shaft 83 may be squared at 85 permitting rotation by means of a removable crank (not shown). A shaft 86 is supported by the machine frame at a distance from and parallel to the shaft 83 and is rigidly connected with a regular gear 87 and a ratchet gear 88. Supported for swivel movement about the axis of shaft 86 is a member 89 carrying a pair of meshing gears 90, 91. The gear 90 is in permanent engagement with the aforesaid gear 87 while the gear 91 is free from direct engagement with the gear 87. The member 89 has an extension 92 with a spring biased plug 93 adapted for engagement with one of three holes 94 of a bracket 95 rigidly supported by the machine frame. The arrangement is such that in one position, the position shown in full lines in Figures 2 and 9, the gear 90 meshes directly with the gear of pinion 84 on the shaft 83 while in the other extreme position, when the plug 93 engages the uppermost hole 94, the gear 91 meshes with the gear 84. Consequently, in the first position, rotation of the gear 87 will drive the gear 84 in one direction, while rotation of the gear 87 in the same direction with the second postion of the gears 90, 91, will cause the gear 84 to be driven in the opposite direction. In the middle position, that is, when plug 93 engages the central hole 94, both gears 90 and 91 are out of engagement with the gear 84 so that no driving connection exists with the gear 87.

A second member 96 is supported for swivel movement about the shaft 86 and is provided with a plurality of pawls 97 adapted for engagement with the teeth of the ratchet wheel 88 in one direction while sliding over the teeth when rotated with the body 96 in the opposite direction. The pawls are so arranged that at least one of them will engage one of the teeth at a certain initial position of the member 96 so as to avoid lost motion and take care of small inaccuracies of the ratchet wheel 88 or of the movement of the member 96.

The member 96 is journalled at 98 to the rod 99 of a piston movable in a cylinder 100 which, in turn, is journalled at 101 to the machine frame. The solenoid valve 102 serves for admitting a pressure medium to the cylinder in front or in back of the piston. If fluid is admitted to the outer end of the cylinder, then the piston will be pushed outward and turn the ratchet wheel correspondingly, thereby moving the welding unit along its tracks a corresponding increment if one of the gears 90 or 91 is in engagement with the gear 84. By varying the size of the gears or by varying the stroke of the piston, the length of each increment can be adjusted to fit the specific requirement. The illustrated machine may, for example, be designed for a fixed step-by-step movement of two inches corresponding to the distance between longitudinally adjacent welds in each area.

The other end of shaft 83, that is, the end supported by the side frame 38, carries one element of a clutch 103 which may be operated by a lever 104. The other element of the clutch is in driving connection with an electric motor 105 over a reduction gear 106. If the gears 90, 91 are in the middle or neutral position, then the welding unit may be driven any distance along its tracks through the motor 105 while the coupling 104 is engaged.

Provision is preferably made for preventing the simultaneous engagement of the two driving means with the shaft 83. This may be done by a switch (not shown) for cutting out the electric motor unless the support 89 for the step-by-step drive is in the middle or neutral position.

Mechanism is also carried by the machine for operating the electrodes in predetermined sequence, for supplying them with welding current and for operating the indexing transport when all the electrodes have gone through one cycle of welding operations. These details of the machine will be described later in connection with the operation of the entire machine.

The shafts 30 carrying the work supports 29 are swingable in brackets 107 secured to the I-beams 24. In the following, but one of the supports will be described, as all of them are alike.

Each support has a transverse member 108, upstanding arms 109, 110 and a transverse portion 111 extending downwardly beyond the shaft 30. A vertical member 112 adapted for engagement with the channel sections 36 of the work is secured to the cross member 108 while the lateral portions of this cross member are adapted for supporting the flanges on the free margins of the side walls 31 of the workpieces.

The arms 109 and 110 of the work support carry swingably about vertical shafts 113 members 114 adapted in one position for firm engagement with the outside of the side walls 31 and the underside of the upper side wall flanges 42. When turned 90 degrees in one direction or the other from the position shown, for instance, in Figures 12 and 15, that is, into one of the positions indicated by phantom lines in Figure 15, the wing members 114 are entirely outside the confines of the workpieces. Swingable latches 115 supported in the side members 109, 110 and matching notches 116 in the hub portions of the wing members 114 serve for holding the wing members either in the operative work-engaging or in one of the inoperative positions.

A cross member 117 has its one end hinged to a projecting pin 118 of the arm 109 while its other end is adapted for engagement by a screw 119 threaded into a yoke 120, which latter is swingably supported at 121 by the other arm 110. The cross member 117 is provided with projections 122 adapted for engagement with the outside of the bottom plate 33 so as to press it firmly against the flange of the side wall and the latter against the top of the wing 114. A central adjustable bolt 123 on member 117 is adapted for engagement with the outside of the channel section 36 so as to press the two bottom wall members 33, 34 firmly together and against the support 112.

In the upright position shown in Figure 12, the supports 29 are consequently adapted for accurately and firmly holding the different pieces of the beam to be assembled in accurate relative position and at the exact height necessary for proper engagement by the electrodes of the welding machine.

On the other hand, it is evident that the supports 29 in the position shown in Figure 12 are in the path of the welding unit 26. For this reason, the machine is designed so that the supports 29 can be folded down about their supporting shafts 30 into the position shown in full lines in Figure 14 where the welder unit, in spite of the downwardly extending portions of its side frames and the relatively low arrangement of its cross members and shafts 39, 83, may pass over them unobstructedly. Such temporary removal of one of the supports is unobjectionable because its clamping and supporting functions are taken over by the hereinbefore described devices 43 on the welder unit.

For individually raising the supports 29 or for folding them down, each shaft 30 carries freely rotatably a gear sector 124 on one side which meshes with a rack 125 guided for longitudinal back and forth movement in brackets 126 secured to one of the I-beams 24. The individual racks for the different supports 29 are interconnected by rods 127 and at one end by a rod 128 to the piston rod of a hydraulic cylinder 129 adapted for moving all racks together back and forth with their interconnecting rods 127, 128. The ends of the cylinder 129 communicate with conduits 130 for a pressure medium controlled by four-way valves 131, one each at the location of each support 29. The arrangement is such that the operation of any one of the valves 131 permits pressure medium to be admitted to one or the other end of the cylinder for moving the racks back or forth.

The pressure medium may be derived from any appropriate source. Each of the supports 29 may be individually coupled with or uncoupled from its gear sector 124. For this purpose, the lower depending portion 111 of each support 129 carries a transverse slidable pin or rod 132. This rod 132 is toothed at 133 over part of its length and this toothed portion is engaged by a pinion 134 carried by a square-ended operating shaft 135. Each sector 124 is provided with two holes 136 spaced 90 degrees from each other with respect to the axis of the shaft 30 and at the same distance from this axis as the rod 132 so that one end of the rod 132 may be projected into either one of these holes.

If a support 29 is folded down as shown in Figure 14 and the gear sector 124 brought into the position illustrated in the same figure in full lines by appropriate movement of the rack 125, then the rod 132 may be projected into the upper hole 136, whereupon admission of pressure fluid to the outer end of the cylinder 129 will cause the rack to move to the right (Figure 14) rotating the sector 124 counterclockwise, the latter taking through the rod 132 the support 29 along until it assumes the upright position shown in phantom lines. Hereupon, the rod 132 may be moved out of engagement with the gear sector 124, whereupon its other end engages the hole in a bracket 137 secured to the opposite I-beam 24. This latter operation secures the support in the upright position while freeing the gear sector and the racks from the particular support 29 so as to allow the desired movement of any other support 29.

The provision of two holes 136 at a distance of 90 degrees permits the folding down of the supports 29 in either direction with a gear sector of slightly more than 90 degrees and with a correspondingly short rack. It will thus be noted that the uncoupling of the support 29 and its gear 124 causes automatic engagement of the support with the supporting structure so as to hold it in upright position.

After the welding unit has been moved to one end of its tracks 22, the supports 29 are secured in upright position and the members of a beam to be connected by welding are secured in the supports 29 in proper relative adjustment. During or after this arrangement of the beam members, the latter are threaded into the guiding device 43 at one end of the welder unit so that they end closely adjacent the welding electrodes.

With the clutch 103 released and the lever 89 set for step-by-step movement in the direction toward and along the work 28, the operating and welding mechanism of the welding unit is set in motion.

The control mechanism for the automatic operation of the machine comprises a continuously driven shaft indicated in Figure 18 by the line 140. For an electrode and transformer arrangement as illustrated in the drawing, this shaft 140 carries five cams 141, 142, 143, 144, 145 each operating on a hydraulic valve 141', 142', 143', 144', 145'. These valves are adapted for admitting a pressure medium from supply conduits 146 through a system of distributing conduits 147 to the respective coordinated cylinders 51, 51' to 53, 53' and 67, 67' for moving the different electrodes. It will be noted that always two cylinders of two pairs of electrodes connected with different transformers are controlled by one of the cam operated valves.

Each time a set of electrodes is brought into engagement with the work through the actuation of one of the valves, one of a number of cams 151 to 155 on shaft 140 actuates one of the switches 151' to 155', and thereby energizes over an appropriate welding timer 156 the respective electrodes.

After all the valves and individual switches have once been actuated, a further cam 156' on shaft 140 energizes the solenoid valve 102 causing one forth and back movement of the piston of cylinder 100 (Figure 2), thereby causing the movement of the welder unit one increment along its tracks into the next welding position, whereupon the cycle of welding operations is automatically repeated.

Provision is made for preventing the flow of welding current through some of the electrodes not yet in engagement with the work or already past engagement with the work at the ends of the workpieces to be united. This may be done by switches 157, 158, 159. The switch 157 is arranged in series with the aforesaid switches 151', 152', 153', that is, the three switches that feed the vertical electrodes arranged in one transverse plane. The switch 158 is inserted in series with the switch 154' that feeds the electrodes carried by the yokes 63 and the switch 159 is inserted in the circuit feeding the electrodes on yoke 64. Ordinarily, these switches are held in closed position by spring biased levers 160. At each end of the tracks 22, the free ends of the levers 160 engage an elongated cam 161. This cam is longitudinally adjustable on a bracket 162 secured to one of the beams 24 (Figure 3). As long as the levers 160 engage these cams 161, the switches 157, 158, 159 are held open and no current can flow through the electrodes in spite of the operation of the hydraulic valves and the different switches 151' to 155'. The cams are longitudinally adjusted so that they will release the respective levers 160 and thereby permit closing of the electric circuits when the respective electrodes reach the work. At the other end of the travel of the welder unit, the cam 161 will engage the levers 160 so as to cut off the current as soon as the electrode in one transverse plane leaves the work.

It will be obvious to those skilled in the modern art of electric welding that only a very diagrammatic outline of the electric system has been given and that actually the electrical system is quite complicated and comprises additional switches and devices for automatically stopping the machine when the work on one workpiece is completed, for cutting out the continuous automatic operation of the hydraulic valves and so on. In view of what constitutes the subject matter of the present invention and in view of the fact that the indicated details in different forms are available in the art, no further disclosure in this respect is necessary.

While a single embodiment of the invention is illustrated and described, it should be understood that the invention is subject to modifications and adaptations which will easily occur to those skilled in the art and that protection is sought for the invention as covered by the spirit and the language of the attached claims.

What is claimed is:

1. In a machine for assembling a plurality of elongated profiles into a beam, a unit provided with means for effecting a series of connections between said profiles, means for supporting said unit, means for relatively moving said unit and said supporting means, and means on said unit for holding the profiles in their predetermined relative position to each other and to the unit during the performance of the connecting operations by said unit.

2. In a machine for connecting a plurality of elongated profiles along their length for forming a beam, a unit provided with means for effecting a series of connections between said profiles, means for supporting said unit movably along said profiles, and means on said unit for holding the profiles in their predetermined relative position to each other and to the unit during the performance of the connecting operations by said means provided on said unit.

3. In a machine for connecting together a plurality of profiles into a beam structure, a frame, means for movably supporting said frame along a predetermined path, means on said frame for making successively the connections between said profiles, and means on both sides of said last-named means for guiding and supporting said profiles in predetermined position relative to each other and the frame.

4. In a machine for welding together a set of profiles into a beam structure, a frame, means for movably supporting said frame along a predetermined path, a plurality of welding electrodes on said frame, and means arranged in the direction of said path on both sides of said electrodes for guiding and supporting a set of profiles in predetermined position relative to the electrodes.

5. In a machine for connecting several profiles with each other throughout their lengths, a stationary track, a structure movably supported on said track, means on said structure for making successively the connections between the profiles, a plurality of supports located at intervals along the length of said track and designed for supporting the profiles to be connected at a predetermined height and in a predetermined relative position to each other, means for bodily removing said supports from the profiles so as to permit the passage of said structure, and means on said structure for temporarily holding said profiles at said predetermined height and position relative to each other during the connecting operations while one of said units in the respective region is removed from the profiles.

6. Machine according to claim 5 in which said supports each as a single unit are arranged between said tracks and are supported swingably about axes extending transversely to and near said tracks so as to fold down for the passage of said structure over them.

7. In a machine for connecting by electric spot welding a plurality of profiles into an open channel section beam, said profiles having overlapping parts in the plane of the bottom wall and overlapping parts in the planes of the side walls of the channel section, a welding unit comprising a structure relatively movable along said profiles, pairs of welding electrodes supported and guided for linear movement by said structure for effecting welds between the overlapping parts of the profile in the plane of the bottom wall of the channel section, pairs of electrodes for effecting the welds between the overlapping parts in the planes of the side walls of the channel section, a plurality of yokes each supporting one pair of the last-named electrodes and supported by said structure swingably about an axis extending parallel to the direction of the movement of the unit, and means for keeping the electrodes and the yokes supporting them out of contact with the workpiece during the intervals between welding operations.

8. In a machine for connecting by electric spot welding a plurality of profiles into an open channel section beam, said profiles having overlapping parts in the plane of a side wall of the channel section, a welding unit comprising a structure relatively movable along said profiles, a pair of electrodes for effecting said welds, a yoke supporting said electrodes and supported by said structure swingably about an axis extending parallel to the direction of the movement of the unit relative to the profiles, and means for keeping the electrodes and the yoke supporting them out of contact with the workpiece during the intervals between welding operations.

9. In a welding machine according to claim 8 having means on one arm of said yoke for moving one of the electrodes relative to the yoke while the other electrode is rigidly supported by the other arm of the yoke, the center of gravity being disposed on the same side of the axis as the fixedly supported electrode whereby the fixedly supported electrode will swing away from the work upon retraction of the movable electrode.

10. In a welding machine according to claim 8 having means on one arm of said yoke for moving one of the electrodes relative to the yoke while the other electrode is rigidly supported by the other arm of the yoke, the center of gravity being disposed on the same side of the axis as the fixedly supported electrode whereby the fixedly supported electrode will swing away from the work upon retraction of the movable electrode, and a stop on said frame designed for engaging said yoke so as to limit the movement of the yoke under the influence of its weight whereby further retraction of the movable electrode will cause it to stand clear of the work.

11. In a machine for effecting a plurality of connections between elongated profiles throughout the length of the latter, a stationary track, a structure movably supported on said track and provided with means for successively effecting said connections, and motor driven means on said structure engaging stationary means for selectively moving said structure step by step through predetermined increments along the track and for selectively moving it any desired distance on said track without interruption.

12. In a machine for effecting a plurality of connections between elongated profiles throughout the length of the latter, a stationary track, a structure on said track provided with means for effecting successively said connections, driving means on said structure drivingly connected with stationary means extending along said track, a first motor driven means on said structure for imparting step-by-step movement a second motor driven means for imparting continuous movement, and means for alternatively coupling one of said motor driven means to said driving means for selectively moving respectively said structure in a series of predetermined increments and continuously any desired distance on said track.

13. A machine according to claim 11 in which said first motor driven means comprises a reciprocating prime mover while said second motor driven means comprises a rotating motor.

14. In a machine for connecting a plurality of profiles throughout their length, a plurality of supports for the profiles longitudinally spaced from each other, individual means on each of said supports for swinging the latter away from the profiles, motor means common to all of said supports for swinging the supports into engagement and out of engagement with the profiles, and individual means on the individual supports and on said motor driven means adapted for individually connecting each support with the motor driven means and for disconnecting it therefrom so that with one motor driven means all supports may be moved individually.

15. In a machine according to claim 14 which includes a plurality of individual control means for said motor, one of said control means being arranged adjacent to each one of said supports.

16. Support for holding a plurality of profiles in a predetermined position preparatory to their connection with each other, said support comprising a member swingably supported about a horizontal transverse axis by stationary bracket means, a gear segment supported swingably about the same axis independently of said member, a rack horizontally movably supported in stationary means and in meshing engagement with the gear segment, a motor for moving the rack back and forth, and means for coupling said member to said gear segment and for uncoupling it therefrom.

17. In a machine for connecting a plurality of profiles throughout their length, a plurality of supports for the profiles longitudinally spaced from each other, individual means on each of said supports for swinging the latter away from the profiles, motor means common to all of said supports for swinging the supports into engagement and out of engagement with the profiles, and individual means on the individual supports and on said motor driven means adapted for individually connecting each support with the motor driven means and for disconnecting it therefrom so that with one motor driven means all supports may be moved individually, and a stationary means designed for engagement by said coupling means upon disengagement thereof from the gear segment so as to hold said member in upright position.

18. In a spot welding machine comprising a welding unit movable along elongated workpieces to be welded together and comprising a series of welding tools arranged in planes spaced from each other in the direction of movement, means for automatically activating said electrodes in a predetermined sequence, and a separate means for each set of electrodes arranged in one plane for preventing the activation of such electrodes prior to and after their engagement with the workpieces.

19. In a spot welding machine, a welding unit movably supported on a track, means for supporting an elongated workpiece parallel to said track, a plurality of welding electrodes arranged in several planes spaced from each other in the direction of the movement of the unit on said tracks, means for automatically moving mated electrodes toward each other and for supplying them with welding current, at least one switch for each set of electrodes arranged in one plane, and means governed by the movement of the unit along said track for operating said switches so as to prevent the supply of welding current to the respective electrodes before the latter are in juxtaposition to the work at the start of an operation of the machine and after such electrodes have left the work at the end of an operation.

20. A welding machine for an elongated workpiece having in profile a relatively flat section to be welded on one side to adjacent angle sections, comprising a welding unit having relative axial movement with respect to said workpiece, and means on said welding unit for holding said angle sections and flat section together for welding, said holding means comprising a first pressure device acting normally on the flat section in opposition to the angle sections and paired pressure devices pressing in the apices of the angle sections at opposite inclinations toward said first pressure device.

21. A welding machine as set forth in claim 20 in which said pressure devices are rollers.

WILLIAM A. WEIGHTMAN.

REFERENCES CITED

The following references are of record in the file of this patent:

UNITED STATES PATENTS

| Number | Name | Date |
| --- | --- | --- |
| 2,190,692 | Bitter et al. | Feb. 20, 1940 |
| 2,339,826 | Weightman | Jan. 25, 1944 |